April 28, 1964  C. A. WAGLEY  3,131,005
THRUST BEARING AND COOLING MEANS THEREFOR
Filed June 8, 1962

INVENTOR
CHARLES A. WAGLEY

BY B. L. Zangwill
ATTORNEY

United States Patent Office 3,131,005
Patented Apr. 28, 1964

3,131,005
THRUST BEARING AND COOLING MEANS THEREFOR
Charles A. Wagley, Montgomery County, Md.
(4703 Overbrook Road, Washington 16, D.C.)
Filed June 8, 1962, Ser. No. 201,217
8 Claims. (Cl. 308—160)
(Granted under Title 35, U.S. Code (1952), sec. 266)

The invention described herein may be manufactured and used by or for the Government of the United States of America for governmental purposes without the payment of any royalties thereon or therefor.

This invention relates to thrust bearings and more particularly it relates to an improved thrust bearing of the Kingsbury type in which a plurality of stationary thrust shoes are located adjacent a rotating member, whereby rotary forces create an oil wedge film between the bearing surfaces of said thrust shoes and rotating member.

Thrust bearings of this type have become extremely well known in the art and have been widely adopted for use in machinery having rotating shafts. Examples of such machinery are steam turbines, air compressors and ships' propeller systems. In large, heavy duty machinery such as this, the bearing is often subjected to an extremely high thrust load. Under such a high thrust load, the heat of friction becomes a critical problem, since the Babbitt coating on the thrust shoes start to melt.

To counteract and compensate for the heat of friction, it has become a standard practice to keep the bearing submerged in and surrounded by oil which circulates around the thrust shoes, thus lubricating them and dissipating the heat produced by friction. This practice reduced somewhat the danger of bearing failure, but it was not altogether satisfactory since the oil film wedge between the thrust shoes and the rotating member was relatively thin and at high pressure the lubricating oil could not easily pass therebetween at a rate sufficient to accomplish the desired cooling. The existence of extreme temperatures at the bearing surface weakened the bearing material and tended to induce early bearing failure.

Another problem which the conventional lubricating methods have been unable to solve is thermal distortion of the thrust shoe itself. The heat of friction is naturally greatest at the bearing sliding or forward surface of the thrust shoe and it decreases appreciably as it is transferred through the thrust shoe to the outer or rear surface thereof. Since, as was described above, the rear surface can be cooled much more readily than the sliding or front surface, this temperature differential between front and rear surfaces becomes increased rather than remedied by conventional cooling methods. The result of such a temperature differential is thermal distortion of the thrust shoe which causes the thrust shoe to "arch" at its outer edges and thus assume a convex configuration wherein only the central portion of the thrust shoe carries the thrust load. Naturally, this leads to spot wear and early failure of the thrust shoe.

The problem of thermal distortion is increased even further by the conventional practice of applying a surface coating of Babbitt bearing metal or some other suitable bearing material to the forward or bearing surface of the thrust shoe. Since this bearing metal coating has a greater coefficient of thermal expansion than the material of the thrust shoe itself, it expands further per degree of temperature increase, and thus adds to the arching or convex effect of the thrust shoe.

Accordingly, an object of this invention is to provide an improved thrust shoe for a thrust bearing, which shoe can accommodate high thrust loads without breakdown or failure.

Another object of this invention is to provide an improved thrust shoe for a thrust bearing, which shoe is substantially free from thermal distortion.

A further object of this invention is to provide a thrust bearing in which the rotational forces which create the oil film wedge upon which the thrust shoes ride are utilized to circulate the cooling medium around and through said thrust shoes.

Still a further object of this invention is to provide an improved thrust shoe for a thrust bearing, which shoe will permit the bearing to operate at a lower and more closely controlled temperature and thereby utilize the high viscosity range of the lubricating oil for added safety.

Other objects, advantages and salient features of the present invention will become apparent from the following description, taken in connection with the accompanying drawings, which illustrate a preferred embodiment, in which.

Figure 1:
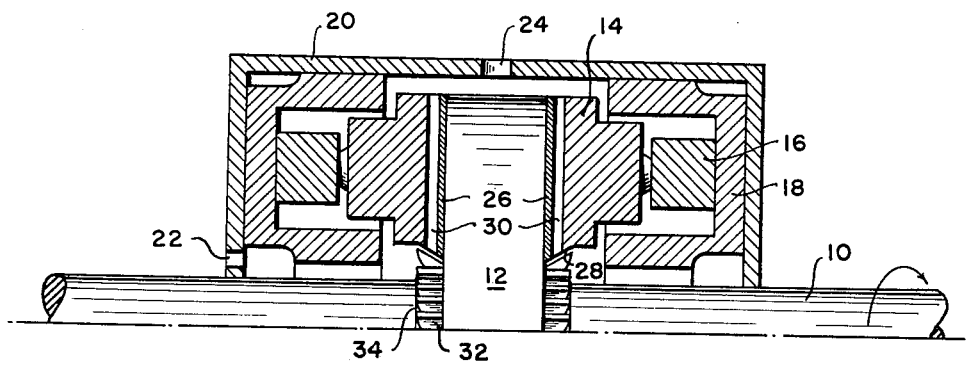
FIG. 1 is a longitudinal sectional view, showing a simplified form of a double acting thrust bearing, embodying the present invention therein.

Referring now to FIG. 1, an assembly is shown in which a shaft 10 which is rotatable by external means, such as some of the machinery described hereinabove, is provided with a thrust runner or collar 12 formed as a circumferentially extending flange portion. Thrust shoes 14 are juxtaposed to said collar 12 on opposite sides thereof, a plurality of such shoes being located in spaced relationship to each other, extending circumferentially around each side of the thrust collar.

Each thrust shoe has a central portion, on the rearward face thereof, which bears against and is supported by a leveling block 16, which in turn is supported within the recess of an annular leveling block housing member 18. Both the leveling blocks 16 and their housing member 18 can be of any conventional configuration well known to those skilled in the art, and since many configurations of such elements are known, no attempt will be made to describe such elements in detail, it being sufficient for purposes of disclosure to state that such elements or their equivalents function in the present invention in their ordinary manner.

The entire assembly of thrust shoes, leveling blocks and leveling block housings are contained within a thrust bearing housing means 20. The housing means 20 contains an inlet aperture 22 for introducing lubricating oil into the interior thereof, and an outlet aperture 24 for expelling the oil therefrom.

The thrust shoes 14 each generally have a thin coating of bearing metal 26, such as Babbitt, affixed to the forward or bearing surface thereof by chemical bonding or other suitable affixation means. The thrust shoes 14 also have a surface 28 which extends from the bearing surface and which generally slopes angularly either toward or away from the collar 12. Although such an angular slope is preferred for best results, it is nevertheless possible for the device to operate with the surface 28 substantially perpendicular to the collar 12. Each thrust shoe 14 is provided with at least one, but preferably a plurality of holes or passages 30 behind its bearing surface, said holes extending completely through said thrust shoe from a lower point somewhere along the sloping surface 28 to an upper point at the outer periphery of said shoe.

Figure 2:
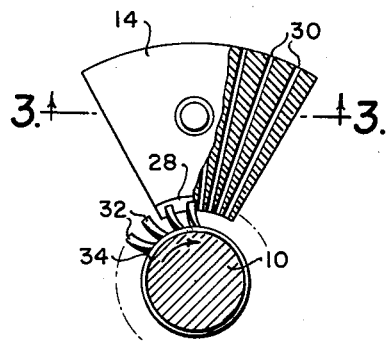
FIG. 2 is an end view, partly in section, of a thrust shoe from the thrust bearing illustrated in FIG. 1, looking axially along the shaft.

As can best be seen in FIG. 2, each thrust shoe is formed as a sector of an annulus, the center of said annulus being the axis of rotation of the shaft 10. The holes or passages 30 extend outward from the axis of rotation, through the shoe 14. In FIG. 2, the holes 30 are shown as extending radially from the axis of rotation. This arrangement is preferred since the shoes will operate satisfactorily regardless of the direction of rotation. However, if only one unidirectional rotation were envisioned, it would be possible to extend the holes angularly through said shoes, the angle being some selected acute angle or angles in the direction of rotation. Also the holes 30 can be discrete or interconnected in any suitable manner.

A fluid impelling blade means, such as vanes 32, extends circumferentially around the shaft 10 adjacent each side of the thrust collar 12. These vanes 32 are illustrated as being attached to a ring member 34 which surrounds the shaft 10 and is attached thereto in any suitable manner, such as, for example, a shrink fit. It is to be understood however, that the vanes 32 can be held in their position adjacent the thrust runner by direct attachment to the shaft or by any other suitable means, and the ring member 34 should only be deemed illustrative of one way of attaching said vanes.

The vanes 32 slope away from the thrust runner 12 at an angle substantially conforming to angle of slope of the surface 28 on the thrust shoes 14. The shape of the vanes should be such that as said vanes are rotated along with the shaft 10, centrifugal force will tend to force the fluid at said vanes axially along said shaft and thus inward toward said thrust runner 12, and from there radially outward through the holes 30 and between the shoes 14. A generally helicoidally shaped vane blade surface has been found to exhibit satisfactory fluid flow properties. As used herein, the term vane or blade includes any configuration or shape which will draw the fluid toward the collar 12 and throw said fluid outward in a radial manner.

In operation, lubricating oil, at a suitable temperature and pressure for both cooling and lubricating, is introduced through the inlet 22 into the thrust bearing housing 20. The oil flows through the recesses in the annular leveling block housings 18, thus cooling the leveling blocks 16 and the rear central portions of the thrust shoes. As the thrust collar 12 rotates relative to the thrust shoes 14, a portion of the oil is drawn into the space which develops between the thrust collar face and the thrust shoe bearing face. Due to the rotational effect, this oil forms a wedge shaped film upon which the thrust shoe bears.

Rotation of the shaft 10 also causes the vanes 32 to pump oil radially outwardly through the holes 30 in each shoe 14. This cools the forward or bearing portion of the shoes thus eliminating excessive heat at the bearing layer 26 and also eliminating the temperature differential between the forward and rear surfaces of the shoes, thus eliminating thermal distortion of the shoes. The faster the rotational speed of the shaft 10 the faster the rate of flow of the oil which the vanes 32 will pump through the holes 30. This feature compensates for the higher heat of friction which occurs as rotational speed of the shaft 10 increases. When the oil completes its cooling movement through the thrust bearing housing 20, it is exhausted through the outlet 24.

Figure 3:
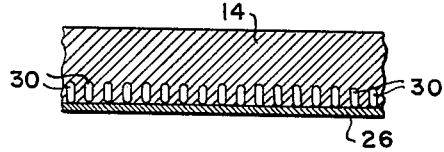
FIG. 3 is a partial transverse sectional view of a thrust shoe taken along a plane indicated by the line 3—3 in FIG. 2.

FIG. 3 shows the holes 30 directly to the rear of the Babbitt bearing surface 26. The holes, in such an arrangement, should be relatively narrow so that the support for the Babbitt coating is not too greatly weakened.

Figure 4:
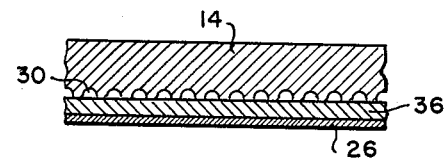
FIGS. 4, 5, 6, and 7 are modifications of the thrust shoe shown in FIG. 3.

FIG. 4 shows a thin plate 36, of copper or steel or some other metal having a high coefficient of thermal conductivity, located behind the Babbitt coating 26. This thin plate 36 serves to support the Babbitt layer 26 and also to allow slightly larger holes 30 to be provided in the thrust shoes 14. If desired, a plurality of cooling fins may be provided in each of the holes 30 to permit greater cooling per unit area of contact, and the holes may be of any shape desired.

Figure 5:
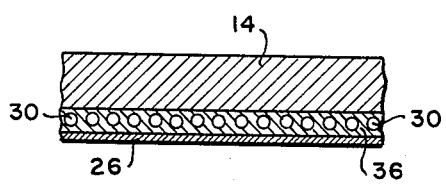

FIG. 5 shows the holes 30 located within the thin plate 36. The plate 36 may be made slightly thicker to accommodate the holes.

Figure 6:
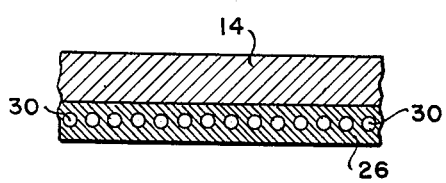

FIG. 6 shows the holes 30 located within the Babbitt coating layer 26. The layer 26 can be made slightly thicker to accommodate the holes.

Figure 7:
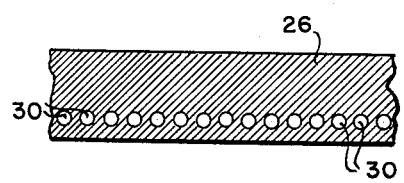

FIG. 7 shows the shoe 14 made entirely of Babbitt or other bearing material. In this situation, the holes can be located at any plane within the shoe.

It can thus be seen that the present invention provides an improved thrust shoe for use in a thrust bearing and a means for cooling the thrust shoe to keep its operating temperature to a minimum. This lower temperature operation allows utilization of the higher viscosity range of the lubricating oil used as a coolant. A graphic representation of how viscosity decreases as temperature increases is shown in "Analysis and Lubrication of Bearings" by Shaw and Macks, published by McGraw-Hill Book Co., 1949, pages 151 and 153.

It will be understood that certain changes can be made from the above described preferred embodiment without departing from the scope of the invention. For instance, the vanes could be moved farther away from the collar member 12, and holes could be located above the vanes in such a manner that the oil would flow through apertures in the leveling block housing and from there into the thrust shoe apertures. Also, although the bearing surfaces have generally been described as planar, it is not necessary to limit them to such a shape and, in fact, the bearing surface may be curved. An example of such a bearing embodying curved bearing surfaces is shown in the above cited Shaw and Macks book on page 320.

It will also be understood that other various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for receiving and transmitting thrust force produced axially along a shaft member, said device comprising, in combination:

a rotatable shaft member whose longitudinal axis defines the axis of rotation;

an enlarged flange means integrally connected to said shaft member and having a pair of opposed surfaces, said flange means defining a thrust collar and said flange means surfaces defining thrust collar bearing surfaces;

a plurality of thrust shoes in spaced, circumferential juxtaposition to each bearing surface of said thrust collar, said thrust shoes each having a forward surface defining a bearing surface;

each of said thrust shoes including a coating of bearing metal upon its bearing surface and a heat conducting plate directly behind said bearing metal coating;

means for retaining said thrust shoe bearing surfaces substantially parallel to said thrust collar bearing surfaces, said means also rendering said thrust shoes incapable of rotation about said axis of rotation;

said thrust shoes being formed as a sector of an annulus having as its center said axis of rotation; and each including a plurality of flow passages extending outwardly from said axis of rotation in direct contact with the interior surface of said heat conducting plate substantially throughout their lengths;

a series of fluid impelling vanes circumferentially spaced about said rotatable shaft member, said vanes being located between said shaft member and the inner portion of said thrust shoes in such a manner that the vanes pass substantially directly beneath said flow passages as they are rotated; and a housing member surrounding said thrust shoes and their retaining means, said housing member including a fluid coolant inlet and outlet;

whereby, as said shaft member rotates, fluid entering said housing through said inlet is drawn between said thrust collar and thrust shoe bearing surfaces as they rotate relative to each other, and said fluid is also pumped by said impelling vanes through said flow passages to thereby cool said thrust shoes to prevent overheating and thermal distortion thereof.

2. A device for receiving and transmitting thrust force produced axially along a shaft member, said device comprising, in combination:

a rotatable shaft member whose longitudinal axis defines the axis of rotation;

an enlarged flange means integrally connected to said shaft member and having a pair of opposed surfaces, said flange means defining a thrust collar and said flange means surfaces defining thust collar bearing surfaces;

a plurality of thrust shoes in spaced, circumferential juxtaposition to each bearing surface of said thrust collar, said thrust shoes each having a forward surface defining a bearing surface;

each of said thrust shoes including a coating of bearing metal upon its bearing surface and a heat conducting plate directly behind said bearing metal coating;

means for retaining said thrust shoe bearing surfaces substantially parallel to said thrust collar bearing surfaces, said means also rendering said thrust shoes incapable of rotation about said axis of rotation;

said thrust shoes being formed as a sector of an annulus having as its center said axis of rotation; and each including a plurality of flow passages extending outwardly from said axis of rotation through the interior of said heat conducting plate substantially throughout their length;

a series of fluid impelling vanes circumferentially spaced about said rotatable shaft member, said vanes being located between said shaft member and the inner portion of said thrust shoes in such a manner that the vanes pass substantially directly beneath said flow passages as they are rotated; and a housing member surrounding said thrust shoes and their retaining means, said housing member including a fluid coolant inlet and outlet;

whereby, as said shaft member rotates, fluid entering said housing through said inlet is drawn between said thrust collar and thrust shoe bearing surfaces as they rotate relative to each other, and said fluid is also pumped by said impelling vanes through said flow passages to thereby cool said thrust shoes to prevent overheating and thermal distortion thereof.

3. An improved cooling means for the shoes of a thrust bearing assembly comprising:

thrust shoe means having a planar bearing surface and inner and outer circular boundary and radial side boundaries, said inner and outer boundary and side boundaries defining the area of said bearing surface;

the inner boundary of said thrust shoe means including a sloped portion;

said thrust shoe means including at least one aperture means, said aperture means being situated in a plane substantially parallel to the plane of said bearing surface and extending into said sloped surface at its lower extremities; and fluid impelling means located adjacent the inner boundary of said thrust shoe means and rotatable relative thereto to propel a fluid coolant through said aperture means and thereby cool said thrust shoe means to counteract any temperature rise which is occasioned by heat of friction at said bearing surface.

4. An improved cooling means as defined in claim 3 wherein said fluid impelling means slopes to conform generally to said sloped portion, said thrust shoe means sloped portion and said fluid impelling means thus defining spaced juxtaposed surfaces.

5. An improved cooling means for the shoes of a thrust bearing assembly comprising:

thrust shoe means having a planar bearing surface consisting of a coating of bearing metal coated on a heat conductive metal plate and having inner and outer circular boundary and radial side boundaries, said inner and outer boundary and side boundaries defining the area of said bearing surface;

said thrust shoe means including at least one aperture means, said aperture means being situated in a plane substantially parallel to the plane of said bearing surface in intimate contact with said metal plate; and fluid impelling means located adjacent the inner boundary of said thrust shoe means and rotatable relative thereto to propel a fluid coolant through said aperture means and thereby cool said thrust shoe means to counteract any temperature rise which is occasioned by heat of friction at said bearing surface.

6. A thrust bearing assembly comprising:

a rotating shaft;

a thrust bearing for said shaft;

said thrust bearing including thrust shoe means having a planar bearing surface with an inner boundary adapted to be adjacent said rotating shaft;

said thrust shoe means planar bearing surface consisting of a coating of bearing material coated upon a heat conductive metal plate;

said thrust shoe means including at least one aperture therein having an inlet and an outlet, said inlet being located at said inner boundary and thus adjacent said rotating shaft; said aperture being in intimate contact with said metal plate; and means driven by said shaft for forcing cooling fluid into said inlet and through said aperture to thereby cool said shoe means.

7. An improved cooling means for the shoes of a rotating shaft thrust bearing assembly comprising:

thrust shoe means mounted on said rotatable shaft and having a planar bearing surface and inner and outer circular boundary and radial side boundaries, said inner and outer boundary and said side boundaries defining the area of said bearing surface; at least the planar bearing surface portion of said thrust shoe means consisting of bearing metal;

said thrust shoe means including a plurality of aperture means, said aperture means being situated in a plane substantially parallel to the plane of said bearing surface and being in intimate contact with said bearing metal throughout their length;

a series of fluid impelling vanes circumferentially spaced about said rotatable shaft, said vanes being located between said shaft and the inner boundary of said thrust shoe means in a manner such that the vanes pass substantially beneath said apertures as they are rotated, thereby to propel a fluid coolant through said aperture means and thereby cool said thrust shoe means to counteract any temperature rise which is occasioned by heat of friction at said bearing surface.

8. An improved cooling means for the shoes of a rotating shaft thrust bearing assembly as defined in claim 7 wherein the inner boundary of said thrust shoe means includes a sloped portion, said aperture means extending into said sloped surface at its lower extremities and wherein said fluid impelling vanes slope at their outer extremities to conform generally to said sloped portion, said fluid impelling vanes and said thrust shoe means sloped portion thus defining spaced juxtaposed surfaces.

References Cited in the file of this patent

UNITED STATES PATENTS

| 2,744,799 | Howarth | May 8, 1956 |
| 2,955,003 | Sheppard | Oct. 4, 1960 |

FOREIGN PATENTS

| 942,629 | France | Sept. 20, 1948 |
| 131,884 | Australia | Mar. 22, 1949 |
| 585,992 | Canada | Oct. 27, 1959 |